United States Patent [19]

Hendewerk

[11] Patent Number: 5,001,197

[45] Date of Patent: Mar. 19, 1991

[54] POLYPROPYLENE COMPOSITION AND METHOD FOR FUNCTIONALIZATION OF POLYPROPYLENE

[75] Inventor: Monica L. Hendewerk, Houston, Tex.

[73] Assignee: Exxon Chemical Patents Inc., Linden, N.J.

[21] Appl. No.: 349,612

[22] Filed: May 10, 1989

[51] Int. Cl.$^5$ ............................................. C08F 267/04
[52] U.S. Cl. ..................................... 525/285; 525/288; 525/293; 525/296; 525/301; 525/263
[58] Field of Search ............... 525/285, 288, 293, 296, 525/301, 263

[56] References Cited

U.S. PATENT DOCUMENTS

| | | |
|---|---|---|
| 3,234,196 | 2/1966 | Leavitt . |
| 3,414,551 | 12/1968 | Reid et al. .......................... 260/88.2 |
| 4,086,171 | 4/1978 | Wood et al. . |
| 4,299,754 | 11/1981 | Shiomi et al. ........................ 525/285 |
| 4,370,450 | 1/1983 | Grigo et al. .......................... 525/262 |
| 4,404,312 | 9/1983 | Kobubu et al. ...................... 524/504 |
| 4,506,056 | 3/1985 | Gaylord ............................... 524/445 |
| 4,507,423 | 3/1985 | Sasaki et al. ......................... 525/285 |
| 4,588,765 | 5/1986 | Beever . |
| 4,639,495 | 1/1987 | Waggoner ............................ 525/285 |
| 4,657,970 | 4/1987 | Shiraki et al. . |
| 4,727,120 | 2/1988 | Nogues ................................ 525/285 |

FOREIGN PATENT DOCUMENTS

0189672 8/1986 European Pat. Off. .
0225186 10/1987 European Pat. Off. ................ 255/2

Primary Examiner—John C. Bluetse
Assistant Examiner—Vasu S. Jagannathan
Attorney, Agent, or Firm—M. B. Kurtzman

[57] ABSTRACT

The present invention relates to a process for the functionalization, and preferably the maleation of a polyolefin, preferably polypropylene, by use of a selected class of peroxides which will not cause the molecular weight of the polyolefin to significantly degrade. The class of peroxide initiators which are capable of successful use in the present invention may be more broadly classified as peroxides which have radical fragments when the peroxide is dissociated, which are a combination of R· and RO·, where R is an aliphatic hydrocarbon, and 0 is oxygen. The preferred peroxide initiators for use in carrying out the present invention so as to obtain the results indicated above are t-butyl peroxypivalate and isononanoyl peroxide. The composition resulting from the practice of the process of the invention is a maleated polypropylene in which the polypropylene has more than 0.3 weight percent grafted maleic anhydride and preferably greater than 0.4 weight percent, for example, from 0.4 to 4 weight percent or more grafted maleic anhydride on the polymer chains and in which the MFR is less than 100.

26 Claims, 2 Drawing Sheets

POLYPROPYLENE COMPOSITION AND METHOD FOR FUNCTIONALIZATION OF POLYPROPYLENE

BACKGROUND OF THE INVENTION

1. Field of the Invention

This invention relates to a new functionalized polypropylene composition and a new and improved process for the functionalization of polypropylene, particularly the maleation of polypropylene.

2. Brief Description of the Prior Art

To prepare polypropylene for certain end-use applications it is necessary to functionalize the polymer, i.e., to incorporate functional groups such as maleic anhydride onto the polypropylene polymer chains. The reaction of maleic anhydride with polypropylene is well known in the art. Examples of the prior art are U.S. Pat. Nos. 4,404,312; 4,506,056; 3,414,551; 4,370,450; and 4,639,495. European Patent application 0 225 186 is another example of a method of grafting maleic anhydride onto polypropylene. In the prior art, the maleation of polypropylene has been accomplished by the use of free radical initiators such as a peroxide initiator to induce maleation. However, the prior art peroxides which have been used for functionalizing polypropylene cause substantial degradation of the molecular weight of the maleated polypropylene. In an attempt to avoid molecular weight degradation of the maleated polypropylene the prior art methods employed low levels of peroxide initiator. See, for example, U.S. Pat. No. 4,404,312 which states that the organic peroxide should not be more than about 0.1 percent by weight, and preferably not more than 0.01 percent by weight of the polypropylene to be reacted. As a result, in the prior art, the extent of maleation of the polypropylene has been restricted. Other attempts to avoid the molecular weight degradation require the use of a third ingredient, such as styrene, which becomes a part of the polymer, or require the use of a catalyst such as N,N-dialkylethanolamine, or other nitrogen, phosphorus, or sulfur containing compounds. Examples of such ingredients are found in U.S. Pat. No. 4,506,056 and EPO Application 0 225 186.

SUMMARY OF THE INVENTION

The present invention is a novel composition wherein the molecular weight of a functionalized polypropylene product is greater than heretofore obtained with the prior art radical initiators, and a novel functionalization process wherein minimal molecular weight degradation of the polypropylene occurs during a radical initiated functionalization process. This is accomplished by the use of a selected class of peroxides which have been found to produce significant grafting of unsaturated monomers useful for functionalizing polypropylene, such as maleic anhydride, himic anhydride, acrylic acid, methacrylic acid, vinyltrimethoxysilane, acrylamide, itaconic acid, maleic acid, fumaric acid, monomethyl maleate, monoethyl maleate, fumaric anhydride, vinyl amines and amides, and other substituted vinyl monomers that are capable of free radical polymerization, onto polypropylene without causing significant molecular weight degradation of the polypropylene.

Polypropylene has many attractive characteristics such as a high melting temperature, low density, chemical inertness and low cost. However, in order to use polypropylene in applications such as adhesives, coextrudable tie layers for multilayer composites, metal coatings, and polymer blends, it is necessary to chemically modify polypropylene to incorporate a reactive moiety onto the backbone of the polymer. As a primary advantage of the present invention, one can employ high levels of peroxide and obtain a polymer composition having a high molecular weight with a significant level of functionality which can be made into film or otherwise processed by extrusion, fiber spinning, etc. In contrast, the lower molecular weight functionalized polypropylene produced by conventional approaches generally cannot be so used or processed.

A further advantage of the present invention is that the molecular weight degradation of polypropylene can be controlled, independent of the level of grafting of maleic anhydride onto the polypropylene, through variation in temperature, time and other process variables. In the prior art, molecular weight degradation increases when increasing amounts of peroxides are used to increase grafting.

The process of this invention does not require the presence of a catalyst, additive, or process modifier (third ingredient) as disclosed in U.S. Pat. No. 4,506,056 to prevent molecular weight degradation. The functionalized polypropylene compounds produced with the process of this invention have a melt flow rate (MFR) of one hundred (100) or less, (measured by ASTM Standard F 1238-86), but preferably seventy-five (75) or less. The peroxide initiators preferred for use in practice of the process have a short half-life ($t_{\frac{1}{2}}$) at 180° C., preferably less than 3 seconds at 180° C., and the peroxide initiator decomposes to produce radical fragments in combinations of either R· or RO·, wherein R is an alkyl group, preferably a $C_1$–$C_{30}$ alkyl group. When the radical is RO·, R is most preferably t-butyl. The energy for bonding a hydrogen atom to these types of radicals is about 105 Kcal/mol or less. The peroxides preferred for use in the process are t-butyl peroxypivalate or isononanoyl peroxide.

DETAILED DESCRIPTION OF THE INVENTION

The present invention relates to a process for the functionalization, preferably the maleation of a polyolefin, preferably polypropylene, by use of a selected class of peroxides which will not cause the molecular weight of the polyolefin to significantly degrade. While the differences between polypropylene and its copolymers are recognized, the term "polypropylene" as used in the claims includes both homopolymers and copolymers of propylene for the sake of convenience. The process of this invention does not require the presence of a catalyst, additive, or process modifier to prevent molecular weight degradation.

The functionalizing agent employed in the process of this invention may be any of the unsaturated monomers conventionally used to functionalize a polyolefin. Such functionalizing agents include, for example, carboxylic acids such as acrylic and methacrylic acid; acid anhydrides such as maleic and himic anhydride; acid amides such as acrylamide; and vinyl siloxanes such as vinyltrimethoxysilane. The functionalizing agent preferred for use in the process shall be described and illustrated with reference to the functionalization of polypropylene by reaction with maleic anhydride (MAH). Although the invention will be described with reference to maleic anhydride, it should be understood that functionalizing reagents different from maleic anhydride, such as the unsaturated monomers previously identified, can be employed in the practice of this invention. Accordingly, the term "maleation" or "maleated" as used hereafter should be understood to mean "functionalization" insofar as the use of functionalizing reagents other than maleic anhydride are contemplated for use in the process of the invention.

The composition resulting from the practice of the process of the invention is a maleated polypropylene in which the polypropylene has on the average more than 0.3 weight percent (0.13 mole %) grafted maleic anhydride and preferably greater than 0.4 weight percent (0.17 mole %) grafted maleic anhydride, and an MFR of less than 100. The mole % most preferably is in the range of 0.13–1.71.

Figure 1:
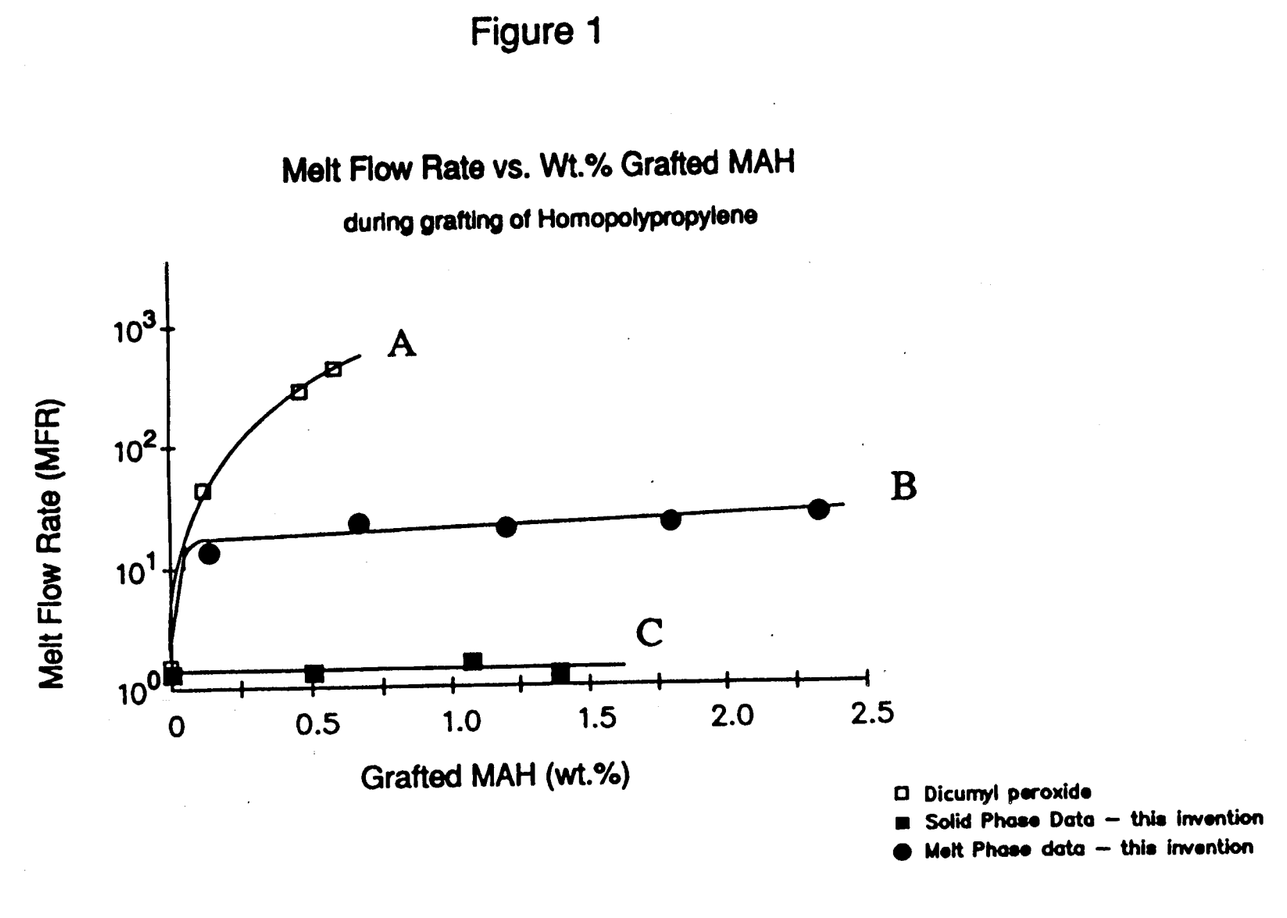
FIG. 1 is a graph of the melt flow rate (MFR) versus the weight percent of maleic anhydride incorporated for maleated polypropylene compositions produced by using dicumyl peroxide, a typical peroxide used in radical initiated grafting processes, compared to a maleated polypropylene composition produced by either of two preferred embodiments of the process of the present invention, one embodiment being a melt phase process (B) and the second embodiment being a solid phase process (C).
Figure 2:
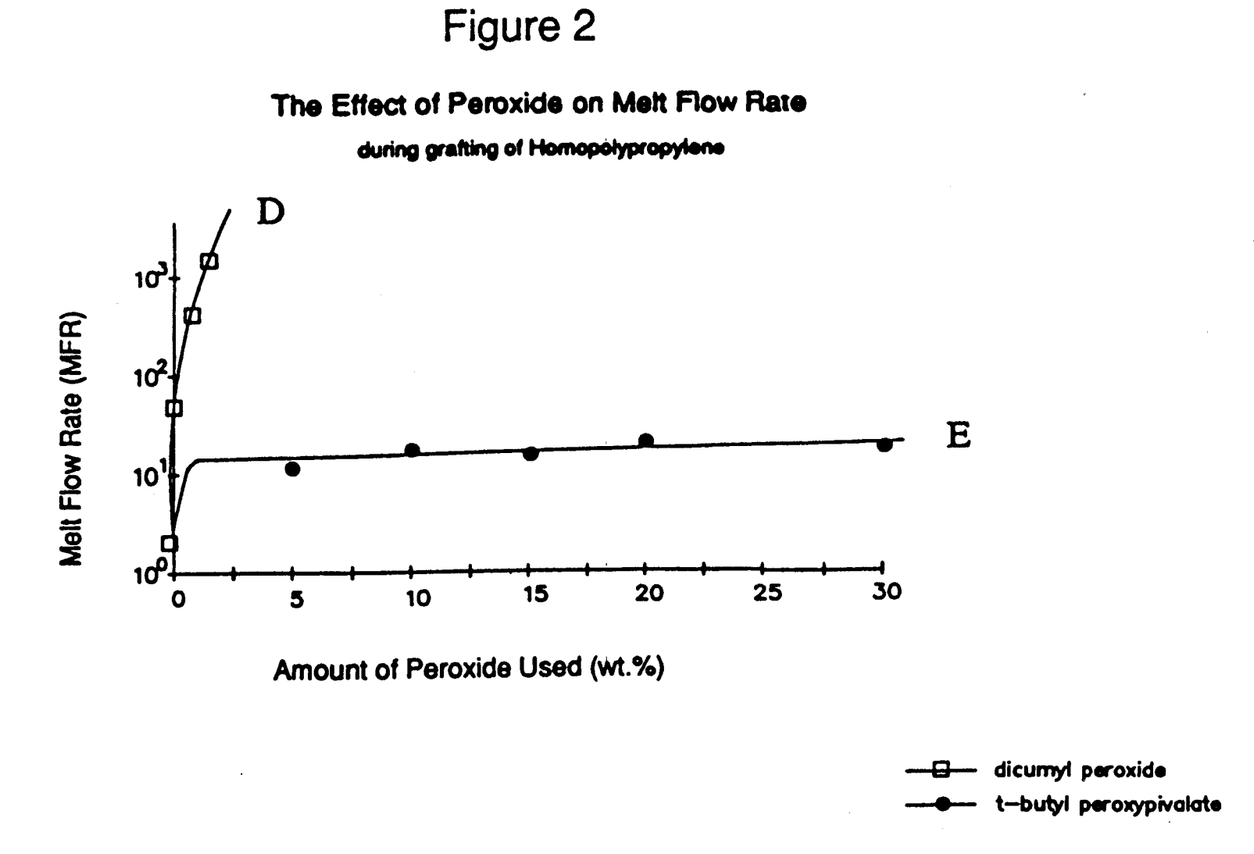
FIG. 2 is a graph of the melt flow rate (MFR) of a functionalized polypropylene versus the amount of peroxide initiator used to produce the functionalized polypropylene composition, for a functionalized polypropylene produced using dicumyl peroxide in accordance with prior art processes (D) and for a functionalized polypropylene produced using t-butyl peroxypivalate in accordance with the process of this invention (E).

The melt flow rate (MFR) of the maleated polypropylene, measured by ASTM Standard E1238-8, is about one hundred (100) or less, preferably less than 75, and most preferably less than 60. These values can be compared with the prior art as in Table 2 where it is demonstrated that the use of peroxides typically used in the prior art produces maleated polypropylenes with MFR's greater than 300. Maleated polypropylene made by the prior art methods with an MFR of less than 100 contain very low levels of grafted maleic anhydride, as demonstrated by the overlapping area of the curves in FIG. 1 in the region of very low weight percent grafted maleic anhydride, low MFR. In accordance with this invention in which polypropylene does not significantly degrade, the MFR of the maleated polypropylene product is related to the MFR of the initial polypropylene polymer. The advantage of the composition of this invention is that the maleated polymer product can be made into films or can be processed by extrusion, fiber spinning, etc; and used in engineering plastic applications whereas the lower molecular weight functionalized polymers produced by prior art functionalization processes generally have MFR's much greater than 100 and cannot be so processed.

In carrying out the process of the present invention, the maleic anhydride and peroxide reagents should be mixed with the polypropylene preferably before the polypropylene is heated, and most preferably the maleic anhydride and the peroxide free radical initiator should be mixed prior to adding such mixture to the polypropylene. Although use of a solvent is not required for mixing the reagents with polypropylene, using an inert, low molecular weight, volatile solvent, such as pentane, hexane, or other hydrocarbons, or methylethyl ketone, acetone, or other low molecular weight species, or any other suitable liquid, to coat the polymer with the reagents, does improve the mixing of the reagents and improve the dispersion of the reagent mixture on the polypropylene when so used. The mixture of peroxide initiator and maleic anhydride is added to the polypropylene to coat the polymer with such components of the mixture. If a solvent is used as a coating and dispersion aid for the reagents, after the mixture is coated onto the polypropylene the solvent is evaporated from the polymer, leaving the maleic anhydride and peroxide reagents on the surface of the polypropylene.

Thereafter, the polymer with the reagents present is treated in one of two ways.

A preferred mode for conducting the reaction of maleic anhydride with polypropylene is in the melt phase mode wherein the temperature exceeds 160° C. In accordance with this embodiment, a high level of grafting with minimal molecular weight degradation is obtained. In accordance with this mode, the polypropylene is mixed with the peroxide and maleic anhydride or coated by evaporation of inert diluent from a slurry of peroxide/maleic anhydride. Typical diluents are pentane, heptane, methyl, ethyl, ketone and the like. Thereafter, the reagent coated polypropylene granules or pellets are heated in a vessel such as a Brabender plasticorder, an autoclave, an extruder or other equipment of like purpose or are reacted in a fluidized bed or gas phase reactor. Good results are obtained at temperatures of about 180°–250° C., but preferably 180°–220° C. The longer the time that the polypropylene is subjected to the reaction temperature, namely the preferred temperature of 180°–220° C., the greater will be the amount of grafted maleic anhydride, without further degrading the molecular weight of the polypropylene.

An alternative method for conducting the maleation reaction is in the particulate or solid phase, at a temperature below the melting point of the polypropylene, namely at a temperature of less than about 165° C. In accordance with this mode, the closer to 165° C. the better the grafting results obtained. The MFR of maleated polypropylene products produced in the particulate phase is less than fifty (50) but most commonly less than ten (10) when starting with a polypropylene resin having an MFR of 3. The longer the time that the polypropylene is subjected to the reaction temperature, namely the preferred temperature of 150°–165° C. the greater will be the amount of the grafted maleic anhydride, without further degrading the molecular weight of the polypropylene.

Alternatively, in either the melt phase or solid phase mode, the maleic anhydride and the select peroxide can be added to the polypropylene separately. Addition of the maleic anhydride separately from the peroxide results in lower grafting levels, but maintains the advantage of insignificant molecular weight degradation of the polymer product.

Since in the process of the present invention the molecular weight of the polypropylene is not significantly degraded, the amount of the peroxide used, based on the quantity of polypropylene to be reacted, may be as high as 10 mole percent, calculated as the number of moles of peroxide per mole of propylene monomer units ($C_3H_6$ units) present. The preferred amounts of the peroxide initiator are in the range of about 0.14 to 6 mole percent.

The presence of a catalyst, additive, or other process modifier during reaction is not required in order to accomplish the objectives of the present invention, namely, the grafting of substantial quantities of maleic anhydride to polypropylene without significant degradation of the polypropylene molecular weight. However, such catalysts, additives, or other process modifiers can be included in this reaction to obtain similar results as given in the prior art for other processes using other peroxides (EPO Patent Application 0 225 186). As above mentioned, it is generally desirable in this invention to use a minor amount of a low molecular weight hydrocarbon or other solvent to enhance the mixing of the reagents and to disperse the reagent mixture on the polypropylene.

With the process of the present invention the maleated polypropylene produced will have an MFR of one hundred (100) or less, i.e.; from 0 to 100, and desirably 0–75, and most desirably 0–60, indicating that the molecular weight of the maleated polypropylene product is much higher than the prior art polymers of polypropylene with equivalent amounts of maleic anhydride grafted using peroxide initiators. Also, in accordance with this invention the amount of maleic anhydride grafted is greater than 0.3 weight percent and preferably greater than 0.4 weight percent grafted maleic anhydride with an MFR of less than 100 which distinguishes the present invention from the prior art.

The preferred peroxide initiators for use in carrying out the present invention so as to obtain the results indicated above are t-butyl peroxypivalate and isononanoyl peroxide. The class of peroxide initiators which are capable of successful use in the present invention may be more broadly classified as peroxides which have radical fragments when the peroxide is dissociated, which are a combination of R· and RO·, where R is an aliphatic hydrocarbon, and O is oxygen. Such radical fragments exist (1) when the peroxide separates at the two oxygen atoms in the middle of the peroxide (dissociation), or (2) when the fragments formed by dissociation undergo decarboxylation or beta-scission after separation at the two oxygen atoms in the middle of the peroxide. The dissociation pathway for t-butyl peroxypivalate is:

[1] $(CH_3)_3C-\overset{O}{\overset{\|}{C}}-O-O-C(CH_3)_3 \xrightarrow{dissociation}$

[2] $(CH_3)_3C-\overset{O}{\overset{\|}{C}}-O\cdot + \cdot O-C(CH_3)_3 \xrightarrow{decarboxylation}$

[3] $(CH_3)_3C\cdot + CO_2 + \cdot O-C(CH_3)_3$

R·  RO·

It has been found that the hydrogen bond energy, i.e. the energy gained by adding a hydrogen radical (H·) to a peroxide radical (P·):

P· + H· → P—H     ΔH = hydrogen bond energy can be related to whether the peroxide initiator will function in the present invention. Table 1 shows the hydrogen bond energy and conversely the radical stability for various free radicals or radical fragments which may exist after a peroxide dissociates.

TABLE 1

| Radical Type | Approximate Hydrogen Bond Energy | Radical Reactivity (Hydrogen Abstraction) |
|---|---|---|
|  or  | 112 Kcal/mol | Most Reactive |
| RO· | 105 Kcal/mol | |
| H$_3$C· | 104 Kcal/mol | |
| RCH$_2$· | 98 Kcal/mol | |
| R$_2$CH· | 95 Kcal/mol | |
| R$_3$C· | 91 Kcal/mol | Least Reactive |

Peroxides which dissociate into free radicals with a hydrogen bond energy of about 105 Kcal/mol and below, and which have a short half life at 180° C. are most satisfactory for the purposes of the present invention, namely, producing a functionalized polypropylene, particularly a maleated polypropylene, with minimal degradation of its molecular weight.

EXAMPLES

In the examples and tables which follow, the quantities of reagents employed and the properties of resulting compositions were determined as follows:

The melt flow rate (MFR) of the starting polymer and of the maleated polymer product were determined in accordance with ASTM Standard D1238-86, i.e., a melt temperature of 230° C. and a load of 2.16 Kg.

The amount of maleic anhydride (MAH) used for reaction with a polymer is reported as weight percent MAH. The weight percent MAH was calculated as the number of grams of maleic anhydride present per gram of polymer multiplied by 100.

The molar concentration of peroxide used, as reported in the examples and tables, was calculated as the number of moles of peroxide per mole of monomer units in the polymer being reacted. Wherein polypropylene was the polymer reacted (Examples 1 to 23) the molar concentration of peroxide used was calculated as the ratio of the moles of peroxide to the moles of propylene monomer units (C$_3$H$_6$, M.H. = 42 g/mole) present in the polymer. Wherein an ethylene-propylene copolymer was the polymer reacted (in Examples 23–27) the molar concentration of peroxide used was calculated as the ratio of moles of peroxide to the sum of the moles of propylene and ethylene monomer units (C$_3$H$_6$, M.W. = 42 g/mole; C$_4$H$_4$, M.W. = 28 g/mole) present.

To determine the amount of maleic anhydride grafted onto the polymer, the maleated polymer was dissolved in xylene then precipitated from solution with acetone, filtered and dried. All samples in the examples were treated in this fashion. The weight percent of maleic anhydride grafted to the polymer was then determined by Fourier Transform Infrared (FTIR) analysis. FTIR films were pressed at 230° C. for several minutes. The maleic anhydride concentrations grafted to the polymer were calculated from the intensity of the peak appearing between 1782–1790 cm$^{-1}$. The FTIR was calibrated by oxygen analysis performed on maleated polypropylene and maleated ethylene-propylene rubber samples. The molecular weight of the grafted polymer was monitored by measuring the melt flow rate (MFR) using ASTM Standard D1238-86 and by Gel Permeation Chromatography (GPC).

The amount of maleic anhydride and peroxide reagents used and their relative concentration, as well as the temperature chosen, the time of reaction, the MFR or molecular weight of the polymer starting material, and the method of addition of the reagents to the polymer starting material were chosen to illustrate the variety of desired results that may be achieved by varying such conditions in the practice of the process of this invention. The examples which follow are illustrative of such variations, but are not intended to limit or otherwise exclude other combinations of such parameters.

Specific examples of peroxide initiators which are unsatisfactory and those which are satisfactory in carrying out the present invention are given below as Examples 1-11 (comparative) and Examples 12-13 (inventive). Table 2, following Example 13, shows data obtained for the various peroxide initiators utilized in Examples 1-13. Examples labelled with a "C" are comparative examples.

EXAMPLE 1-C

The reaction of isotactic polypropylene having a melt flow rate (MFR) of 3.0 and maleic anhydride in the presence of a peroxide initiator was carried out in a Brabender plasticorder. One hundred forty-four milligrams (144 mg) of dicumyl peroxide (0.07 mole percent) was mixed with 1.6 g maleic anhydride (5 weight percent) at room temperature in the powder form and then mixed with 32 grams of polypropylene granules. The Brabender plasticorder was brought to a temperature of 180° C. and rotated at 30 rpm. While rotating at 30 rpm, the powdered peroxide-maleic anhydride-polypropylene mixture was added to the Brabender plasticorder after which the speed of the Brabender was increased to 60 rpm. The polymer mixture was blended for 10 minutes at 180° C. then removed from the Brabender. The results are summarized in Table 2.

EXAMPLE 2-C

The procedure of Example 1 was followed except that 0.14 mole percent dicumyl peroxide (288) mg was used. The results are summarized in Table 2.

EXAMPLE 3-C

The procedure of Example 1 was followed except that 0.24 mole percent dicumyl peroxide (0.48 g) was used. The results are summarized in Table 2.

EXAMPLE 4-C

The procedure of Example 1 was followed except that 0.31 mole percent dicumyl peroxide (0.64 g) was used. The results are summarized in Table 2.

EXAMPLE 5-C

The procedure of Example 1 was followed except that 0.47 mole percent dicumyl peroxide (0.96 g) was used. The results are summarized in Table 2.

EXAMPLE 6-C

The procedure of Example 1 was followed except that 0.62 mole percent dicumyl peroxide (1.3 g) was used. The results are summarized in Table 2.

EXAMPLE 7-C

The procedure of Example 1 was followed except that 0.78 mole percent dicumyl peroxide (1.6 g) was used. The results are summarized in Table 2.

EXAMPLE 8-C

The procedure of Example 1 was followed except that 4.05 grams of dicumyl peroxide (1.75 mole percent) 3.6 grams of maleic anhydride (10 weight percent MAH) and 36 grams of polypropylene were used. The results are summarized in Table 2.

EXAMPLE 9-C

The reaction of isotactic polypropylene having a MFR of 3.0 and maleic anhydride in the presence of a peroxide initiator was carried out in a Brabender plasticorder. Maleic anhydride, 10 weight percent, and 2,5-dimethyl-2,-5-di(t-butylperoxy) hexane (tradename Lupersol 101), 1.75 mole percent, were dissolved in methyl ethylketone at ambient temperature, then mixed with 36 g polypropylene granules. The solvent was then evaporated from the mixture to leave the peroxide and MAH reagents on the surface of the polypropylene granules. A brabender plasticorder was brought to a temperature of 180° C. and rotated at 30 rpm. While rotating at 30 rpm, the peroxide-maleic anhydride-polypropylene mixture was added to the Brabender plasticorder after which the speed of the Brabender was increased to 60 rpm. The polymer mixture was bulended for 10 minutes at 180° C. then removed from the Brabender. The results are summarized in Table 2.

EXAMPLE 10-C

The procedure of Example 9 was followed except that 1.75 mole percent of t-butyl peracetate (3.6 g) was used as the peroxide initiator. The results are summarized in Table 2.

EXAMPLE 11-C

The procedure of Example 9 was followed except that 1.75 mole percent of benzoyl peroxide (3.9 g) was used as the peroxide initiator. The results are summarized in Table 2.

EXAMPLE 12

The procedure of Example 9 was followed except that 1.61 mole percent of isononanoyl peroxide (7.2 g) was used as the peroxide initiator and 20 weight percent MAH was used. The polymer mixture was blended for five minutes at 210° C. The results are summarized in Table 2.

EXAMPLE 13

The procedure of Example 9 was followed except that 1.75 mole percent of t-butyl peroxypivalate (3.6 g) was used as the peroxide initiator. The results are summarized in Table 2.

TABLE 2

| EXP. No. | REACTANTS | | | INITIAL POLYMER | | REACTION CONDITIONS | | POLYMER PRODUCT | | PEROXIDE HALF LIFE. |
|---|---|---|---|---|---|---|---|---|---|---|
| | PEROXIDE | AMOUNT (mole %) | MAH wt. % | TYPE | MFR | TEMP (°C.) | TIME (min.) | GRAFTED Wt. % | MFR | t₁ @ 180° C. (seconds)* |
| 1-C | dicumyl | 0.07 | 5 | isoPP* | 3.0 | 180 | 10 | 0.2 | 42 | 23 |

TABLE 2-continued

| EXP. No. | REACTANTS | | | | REACTION CONDITIONS | | POLYMER PRODUCT | | PEROXIDE HALF LIFE, |
|---|---|---|---|---|---|---|---|---|---|
| | PEROXIDE | AMOUNT (mole %) | MAH wt. % | INITIAL POLYMER | | TEMP (°C.) | TIME (min.) | GRAFTED Wt. % | MFR | $t_{\frac{1}{2}}$ @ 180° C. (seconds)* |
| | | | | TYPE | MFR | | | | | |
| 2-C | dicumyl peroxide | 0.16 | 5 | isoPP | 3.0 | 180 | 10 | 0.3 | 120 | 23 |
| 3-C | dicumyl peroxide | 0.24 | 5 | isoPP | 3.0 | 180 | 10 | 0.5 | 130 | 23 |
| 4-C | dicumyl peroxide | 0.31 | 5 | isoPP | 3.0 | 180 | 10 | 0.4 | 160 | 23 |
| 5-C | dicumyl peroxide | 0.47 | 5 | isoPP | 3.0 | 180 | 10 | 0.7 | >500 | 23 |
| 6-C | dicumyl peroxide | 0.62 | 5 | isoPP | 3.0 | 180 | 10 | 0.8 | >500 | 23 |
| 7-C | dicumyl peroxide | 0.78 | 5 | isoPP | 3.0 | 180 | 10 | 1.6 | >500 | 23 |
| 8-C | dicumyl peroxide | 1.75 | 10 | isoPP | 3.0 | 180 | 10 | 1.6 | >500 | 23 |
| 9-C | Lupersol 101 | 1.75 | 10 | isoPP | 3.0 | 180 | 10 | 1.6 | >500 | 37 |
| 10-C | t-butyl peracetate | 1.75 | 10 | isoPP | 3.0 | 180 | 10 | 1.1 | 380 | 9 |
| 11-C | benzoyl peroxide | 1.75 | 10 | isoPP | 3.0 | 180 | 10 | 1.0 | 330 | 3 |
| 12 | isonanoyl peroxide | 1.61 | 20 | isoPP | 3.0 | 210 | 5 | 1.9 | 62 | 0.5 |
| 13 | t-butyl peroxypivalate | 1.75 | 10 | isoPP | 3.0 | 180 | 10 | 1.6 | 32 | 0.25 |

*isoPP = isotactic polypropylene

Table 2 vividly illustrates that the MFR of the polymers maleated in accordance with the preferred process of this invention using preferred peroxide initiators, such as t-butyl peroxypivalate and isononanoyl peroxide are well below one hundred (100) demonstrating that minimal molecular weight degradation occurs with peroxide initiators which satisfy the criteria set forth for use in this invention, while still grafting significant amounts of maleic anhydride.

As illustrated by the contrast of Examples 12 and 13 with Examples 1-11, it is also important to the process of this invention that the peroxide initiators have a relatively short half-life at 180° C. The half-life values identified in Table 2 for each peroxide were calculated using activation energies and rate constant data from the *Polymer Handbook* 2nd Edition, Brandrup & Immergut. The two preferred peroxide initiators, for example, have a half-life of tenths of a second at 180° C. Once chosen, the peroxide initiators, with a half-life of less than about three seconds at 180° C., can be used at any temperature. A peroxide having a half-life of over a few seconds at 180° C. will produce a maleated polypropylene product which has a significantly reduced molecular weight.

The following examples Nos. 14-22 illustrate the melt phase mode of maleation of polypropylene in accordance with the process of this invention.

EXAMPLE 14

T-butyl peroxypivalate as the peroxide initiator, maleic anhydride, and polypropylene pellets (MFR=1.0) were added directly to the feed hopper of a single screw extruder-reactor and then passed into the feed zone of the extruder. The polymer passed through all zones of the reactor, held at 180° C., with an average residence time of 1.5 minutes. The amount of peroxide and maleic anhydride used, and the product MFR and MAH grafting level are shown in Table 3.

EXAMPLES 15-21

T-butyl peroxypivalate as the peroxide initiator and maleic anhydride were dissolved in methyl ethylketone at ambient temperature, then mixed with polypropylene granules, MFR 3.0. The solvent was evaporated leaving the MAH and peroxide on the surface of the polymer. A Brabender plasticorder was brought to a temperature of 180° C. and rotated at 30 rpm. While rotating at 30 rpm the peroxide-maleic anhydride-polypropylene mixture was added to the Brabender plasticorder after which the speed of the Brabender was increased to 60 rpm. The polymer mixture was blended for 10 minutes at 180° C., then removed from the Brabender. The amount of peroxide and maleic anhydride used and the time of reaction varied and is reported for each example in Table 3 which follows.

EXAMPLE 22

The procedure of Example 20 was followed except that the Brabender plasticorder was brought to a reaction temperature of 200° C. and the peroxide-MAH-polymer mixture was blended for only 2 minutes. The results are reported in Table 3.

The following examples Nos. 23-25 illustrate the solid phase mode for maleation of polypropylene in accordance with the process of this invention.

EXAMPLES 23-25

Maleic anhydride and t-butyl peroxypivalate (TBPP) as the peroxide initiator were dissolved in methyl ethylketone at ambient temperature, then mixed with polypropylene granules, MFR 3.0. The solvent was evaporated leaving the MAH and peroxide on the surface and in the pores of the polymer granules The dry mixture of peroxide-MAH-polypropylene was added to an autoclave and the autoclave was purged with nitrogen for 15 minutes. The autoclave was evacuated to $10^{-3}$ torr and then closed to external atmosphere. The autoclave was then heated to 150° C. and stirred for a period of time after which its temperature was reduced to room temperature and it was returned to atmospheric pressure. The amount of peroxide and maleic anhydride used and the temperature and time of reaction for each example are summarized in Table 3.

hydride-polypropylene mixture was added to the Brabender plasticorder after which the speed of the Brabender was increased to 60 rpm. The polymer mixture was blended for 10 minutes at 180° C., then removed from the Brabender.

TABLE 3

| EXP. No. | REACTANTS | | INITIAL POLYMER | | REACTION CONDITIONS | | POLYMER PRODUCT | |
|---|---|---|---|---|---|---|---|---|
| | PEROXIDE | AMOUNT (mole %) | MAH wt. % | TYPE | MFR | TEMP (°C.) | TIME (min.) | GRAFTED Wt. % | MFR |
| 14 | TBPP** | 0.21 | 1 | isoPP* | 1.0 | 180 | 1.5 | 0.3 | 6 |
| 15 | TBPP | 0.89 | 5 | isoPP | 3.0 | 180 | 10 | 0.7 | 33 |
| 16 | TBPP | 1.75 | 10 | isoPP | 3.0 | 180 | 10 | 1.2 | 28 |
| 17 | TBPP | 4.40 | 25 | isoPP | 3.0 | 180 | 10 | 1.9 | 35 |
| 18 | TBPP | 5.30 | 30 | isoPP | 3.0 | 180 | 20 | 2.3 | 42 |
| 19 | TBPP | 0.89 | 5 | isoPP | 3.0 | 180 | 10 | 0.7 | 30 |
| 20 | TBPP | 2.67 | 15 | isoPP | 3.0 | 180 | 10 | 1.2 | 36 |
| 21 | TBPP | 4.42 | 25 | isoPP | 3.0 | 180 | 10 | 1.9 | 35 |
| 18 | TBPP | 4.42 | 25 | isoPP | 3.0 | 180 | 20 | 2.3 | 42 |
| 22 | TBPP | 2.67 | 15 | isoPP | 3.0 | 200 | 2 | 1.2 | 59 |
| 23 | TBPP | 2.67 | 30 | isoPP | 3.0 | 150 | 60 | 0.5 | 1.8 |
| 24 | TBPP | 2.67 | 20 | isoPP | 3.0 | 150 | 180 | 1.1 | 3.2 |
| 25 | TBPP | 2.67 | 20 | isoPP | 3.0 | 150 | 300 | 1.4 | 0.9 |

*isoPP = isotactic polypropylene
**TBPP = t-butyl peroxypivalate

Table 3 demonstrates that parameters such as temperature, reaction time, apparatus type, and reagent concentration can be varied to control the level of grafting and molecular weight breakdown during PP functionalization. In particular it should be noted that when an enclosed apparatus such as an extruder is used (Example 14) a much lower quantity of reagents is required to obtain similar grafting results to the Brabender, which is open at the top.

The polymers useful in this invention include polypropylene and random or block copolymers of propylene with a lesser amount of one or more ($C_2$-$C_{18}$) α-olefins and/or diolefins such as ethylene, butene, hexene, butadiene, hexadiene, and so on. Use of such copolymers results in even higher grafting levels and lower MFR levels than are achieved in the case of homopolypropylene. The lower MFR is achieved because, in addition to the elimination of molecular weight breakdown as described by this invention, some crosslinking occurs in the presence of a peroxide in a copolymer containing other olefins, such as ethylene. This crosslinking phenomenon is well known in the art. Example Nos. 26–32 illustrate the application of this invention to copolymers of propylene with ethylene. The results of such examples are shown in Table 4.

Examples 26 through 29 illustrate melt phase maleation of ethylene-propylene copolymers using the process of this invention. Example 30 illustrates melt phase maleation of ethylene-propylene using prior art. The results are summarized in Table 4.

EXAMPLE 26

An ethylene-propylene copolymer containing; weight percent ethylene was maleated in accordance with the process of the invention. Maleic anhydride and t-butyl peroxypivalate (TBPP) as the peroxide initiator were dissolved in methyl ethylketone or pentane at ambient temperature, then mixed with polypropylene granules, MFR 3.0. The solvent was evaporated leaving the MAH and peroxide on the surface and in the pores of the polymer granules. A Brabender plasticorder was brought to a temperature of 180° C. and rotated at 30 rpm. While rotating at 30 rpm the peroxide-maleic an-

EXAMPLE 27

The procedure of Example 26 was followed except that the ethylene-propylene copolymer used contained 5 weight percent ethylene.

EXAMPLE 28

The process and procedure of Example 14 (extruder reactor) was followed except that the polymer used was an ethylene-propylene copolymer.

EXAMPLE 29

The process and procedure of Example 28 was followed except that the temperatures in the last 2 segments of the extruder were raised to 200° C. and 220° C. respectively.

EXAMPLE 30-C

The process and procedure of Example 14 (extruder reactor) was followed except that the polymer used was an ethylene-propylene copolymer and the peroxide used was a 2,5-dimethyl-2,5-di (t-butylperoxy)hexene (tradename Lupersol 130). The results are summarized in Table 4.

Examples 31 and 32 illustrate the solid phase maleation of ethylene-propylene copolymers using the process of this invention.

EXAMPLE 31

An ethylene-propylene copolymer containing 3 weight percent ethylene was maleated in accordance with the process of the invention. Maleic anhydride and t-butyl peroxypivalate as the peroxide initiator were dissolved in methyl ethylketone or pentane at ambient temperature, then mixed with polypropylene granules, MFR 3.0. The solvent was evaporated leaving the MAH and peroxide on the surface and in the pores of the polymer granules. The dry mixture of peroxide-MAH-polypropylene was added to an autoclave and the autoclave was purged with nitrogen for 15 minutes. The autoclave was evacuated to $10^{-3}$ Torr and then heated to 150° C. The contents were stirred for 60 minutes.

EXAMPLE 32

TABLE 4

| EXP. No. | REACTIONS PEROXIDE | REACTIONS AMOUNT (mole %) | MAH wt. % | INITIAL POLYMER TYPE | INITIAL POLYMER MFR | REACTION CONDITIONS TEMP (°C.) | REACTION CONDITIONS TIME (min.) | POLYMER PRODUCT GRAFTED Wt. % | POLYMER PRODUCT MFR |
|---|---|---|---|---|---|---|---|---|---|
| 20 | TBPP** | 2.67 | 15 | isoPP* | 3.0 | 180 | 10 | 1.2 | 36 |
| 26 | TBPP | 2.67 | 15 | 3% ethylene copolymer of PP | 3.0 | 180 | 10 | 1.4 | 35 |
| 27 | TBPP | 2.67 | 15 | 5% ethylene copolymer of PP | 3.0 | 180 | 10 | 2.0 | 23 |
| 28 | TBPP | 0.21 | 1 | 1.5% ethylene copolymer of PP | 1.7 | 180 | 1.5 | 0.44 | 6 |
| 29 | TBPP | 0.21 | 1 | 1.5% ethylene copolymer of PP | 1.7 | 180–220 | 1.5 | 0.44 | 6 |
| 30-C | LUP 130 | 0.21 | 1 | 1.5% ethylene copolymer of PP | 1.7 | 180 | 2.5 | 0.49 | 540 |
| 23 | TBPP | 2.67 | 30 | isoPP | 3.0 | 150 | 60 | 0.50 | 1.8 |
| 31 | TBPP | 2.67 | 30 | 3% ethylene copolymer of PP | 3.0 | 150 | 60 | 0.80 | 4 |
| 32 | TBPP | 2.67 | 30 | 5% ethylene copolymer of PP | 3.0 | 150 | 60 | 1.7 | 0.5 |

*isoPP = isotactic polypropylene
**TBPP = t-butyl peroxypivalate

The procedure of Example 26 was followed except that the ethyelene-propylene copolymer used contained 5 weight percent ethylene. The results are summarized in Table 4.

Examples 31 and 32, conducted at 150° C. show that significantly less molecular weight degradation occurs in the solid phase experiment than in the melt phase experiment. Comparison of Examples 26–28 with the previous examples demonstrates that the crosslinking affect achieved with the presence of ethylene monomeric units in the polypropylene polymer results in slightly lower MFR than when the crosslinking ability is not present (homopolypropylene). Concomitantly, the 5 percent ethylene copolymer exhibits the lowest MFR under the same maleation conditions.

The foregoing disclosure and description of the invention are illustrative and explanatory thereof, and various changes in the size, shape and materials, as well as in the details of the illustrated construction may be made without departing from the spirit of the invention.

What is claimed:

1. Functionalized polypropylene selected from homopolypropylene and propylene random and block copolymers comprising one or more olefins or diolefins, wherein said block copolymers are comprised of about 5 weight percent or less of said one or more olefins or diolefins, having more than 0.17 mol percent grafted functional groups derived from substituted vinyl monomers that are capable of free radical polymerization, said functionalized polypropylene having an MFR of 100 or less as measured by ASTM standard E-1238-8.

2. The functionalized polypropylene of claim 1 derived from homopolypropylene.

3. The functionalized polypropylene of claim 2, wherein the vinyl monomer is one of an unsaturated acid, anhydride, amide, ester, or a siloxane.

4. The funcationalized polypropylene of claim 2 wherein the grafted functionalized groups are derived from maleic anhydride, himic anhydride, acrylic acid, methacrylic acid, vinyltrimethoxysilane, acrylamide, itaconic acid, maleic acid, fumaric acid, monomethyl maleate, monoethyl maleate, fumaric anhydride, vinyl amines and amides.

5. The funcationalized polypropylene of claim 2 wherein the grafted functionalized groups are derived from an unsaturated anhydride.

6. The funcationalized polypropylene of claim 5 wherein the anhydride is maleic anhydride.

7. The funcationalized polypropylene of claim 3 derived from a copolymer or terpolymer of propylene with one or more of a $C_2$–$C_{18}$ α-olefin or diolefin.

8. A free radical process for functionalizing propylene so as to provide polypropylene with greater than 0.17 mol percent grafted functional groups, comprising
    adding to polypropylene an unsaturated funcationalizing agent and a free radical initiator wherein;
    said unsaturated functionalizing agent is an acid, anhydride, amide or a siloxane; and
    said free radical initiator is a peroxide producing radical fragments, selected from the group consisting of R· and RO·, wherein R is a $C_1$–$C_{30}$ aliphatic hydrocarbon and O is oxygen; and heating the polypropylene while in contact with said free radical initiator and said functionalizing agent at a temperature sufficient to graft the functionalizing agent to the polypropylene, whereby the polypropylene is functionalized with minimal molecular weight degradation.

9. The process of claim 8, wherein:
    the initiator is a peroxide having a $t_{\frac{1}{2}}$ of less than three seconds at 180° C.

10. The process of claim 9, wherein:
    R is t-butyl when the radical fragment is RO·.

11. The process of claim 10, wherein:
    the peroxide initiator is isononanoyl peroxide.

12. The process of claim 9, wherein:

the peroxide initiator upon dissociation has one radical fragment with an alkoxy group, and another radical fragment with an alkyl group.

13. The process of claim 12, wherein:
the peroxide initiator is t-butyl peroxypivalate.

14. The process of claims 11, 12 or 13, wherein:
the functionalizing agent is maleic anhydride.

15. The process of claim 14, wherein:
the polypropylene is heated to a temperature sufficient to melt the polypropylene so that the polypropylene is in the melt phase during the grafting reaction of the maleic anhydride to the polypropylene chain.

16. The process of claim 14, wherein:
the polypropylene is heated to temperature insufficient to melt the polypropylene so that the polypropylene is in the solid phase during the grafting reaction of the maleic anhydride to the polypropylene chain.

17. The process of claim 14, wherein:
the polypropylene is first heated, and the maleic anhydride and peroxide are added.

18. The process of claim 15, wherein:
the temperature in the melt phase is from about the melt temperature of the polypropylene to about 250° C.

19. The process of claim 8, wherein:
the amount of initiator present in the reaction with the polypropylene is equivalent to between about 0.14 mole percent and 6 mole percent based on the number of moles of monomer present.

20. The process of claim 8, wherein:
the resulting functionalized polypropylene has a melt flow rate of about one hundred (100) or less as measured by ASTM standard E-1238-8.

21. The process of claim 8, wherein:
the resulting functionalized polypropylene has an average of two or more functional groups for each polypropylene chain.

22. The product produced by the process of claim 8.
23. The product produced by the process of claim 10.
24. The product produced by the process of claim 19.
25. The product produced by the process of claim 20.
26. The product produced by the process of claim 21.

* * * * *